United States Patent [19]

van der Lely

[11] 4,046,201

[45] Sept. 6, 1977

[54] SOIL CULTIVATING IMPLEMENTS OR ROTARY HARROWS

[76] Inventor: Cornelis van der Lely, 7, Bruschenrain, Zug, Switzerland

[21] Appl. No.: 421,111

[22] Filed: Dec. 3, 1973

[30] Foreign Application Priority Data

Dec. 4, 1972 Netherlands .......................... 7216407

[51] Int. Cl.² ...................... A01B 33/06; A01B 23/02
[52] U.S. Cl. ...................................... 172/59; 172/703; 172/762
[58] Field of Search ...................... 172/47–49, 172/52, 59, 110, 111, 169, 522–526, 702, 703, 713, 762; 403/355, 361, 378, 379; 299/90, 91, 93; 175/421

[56] References Cited

U.S. PATENT DOCUMENTS

| 1,037,091 | 8/1912 | Wedge | 403/355 |
| 1,773,672 | 8/1930 | Grim | 172/49 |
| 1,891,539 | 12/1932 | Honnors | 403/26 |
| 2,206,283 | 7/1940 | Jacobs et al. | 172/38 X |
| 2,463,124 | 3/1949 | Sims | 403/379 X |
| 2,508,832 | 5/1950 | McAninch | 403/355 X |
| 2,921,326 | 1/1960 | Lautman | 15/145 |
| 3,360,285 | 12/1967 | Huckshold | 403/355 X |
| 3,616,862 | 11/1971 | van der Lely | 172/59 X |
| 3,655,244 | 4/1972 | Swisher | 403/361 X |
| 3,774,689 | 11/1973 | van der Lely et al. | 172/112 |
| 3,809,166 | 5/1974 | van der Lely et al. | 172/763 |

FOREIGN PATENT DOCUMENTS

| 1,243,716 | 9/1960 | France | |
| 6,416 | 5/1895 | Sweden | 403/355 |

Primary Examiner—Edgar S. Burr
Assistant Examiner—Paul T. Sewell
Attorney, Agent, or Firm—Mason, Mason & Albright

[57] ABSTRACT

This invention relates to soil cultivating implements or rotary harrows, such implements comprising at least one power-driven soil working member or rotor that includes a tine support secured to a shaft affording the axis of rotation of that member or rotor, the latter also including at least one tine having integral active soil working and fastening portions. The fastening portion of the tine is connected to a holder of said support and can be readily replaced by releasing fastening means that permits the holder and fastening portion to be separated.

10 Claims, 22 Drawing Figures

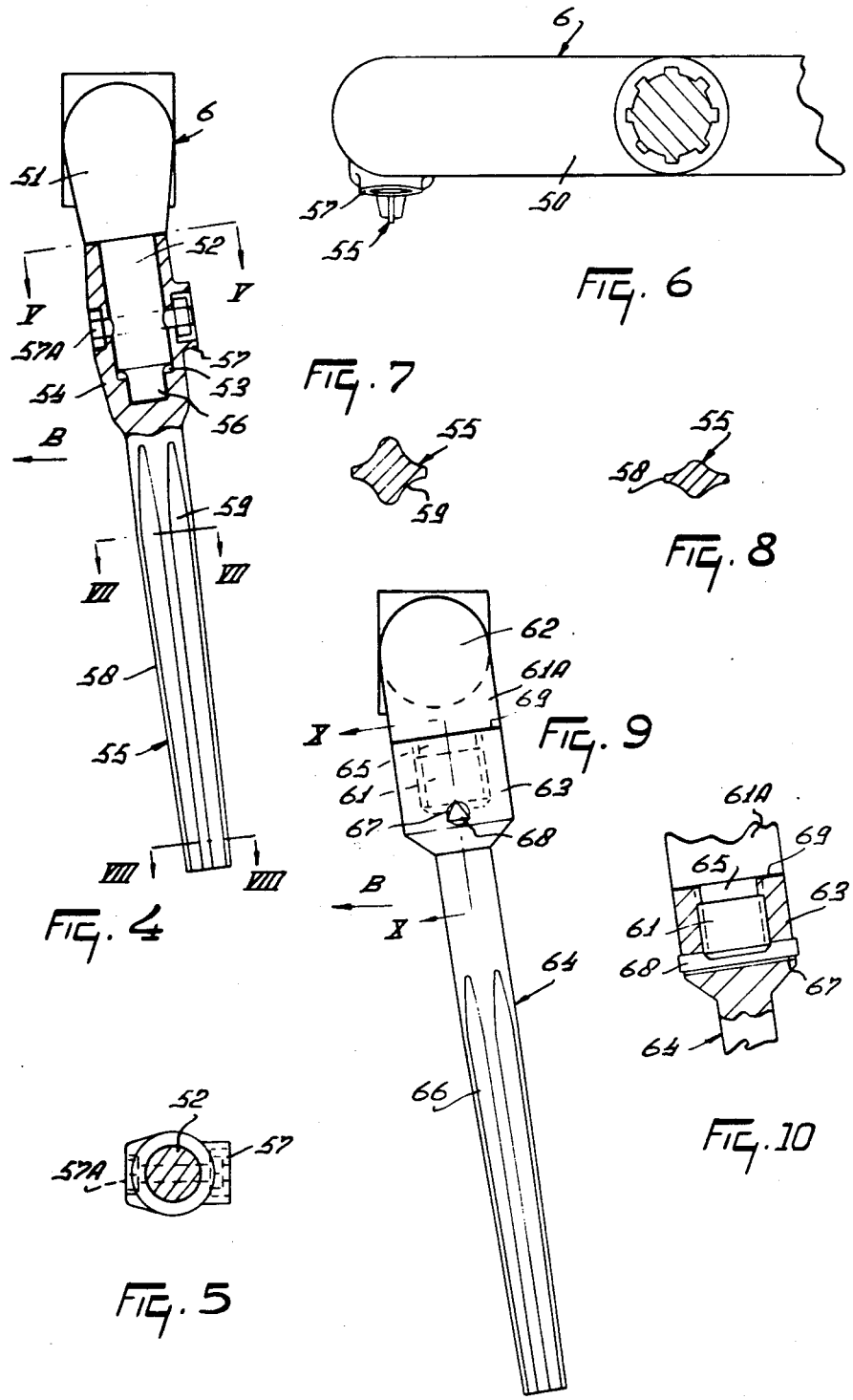

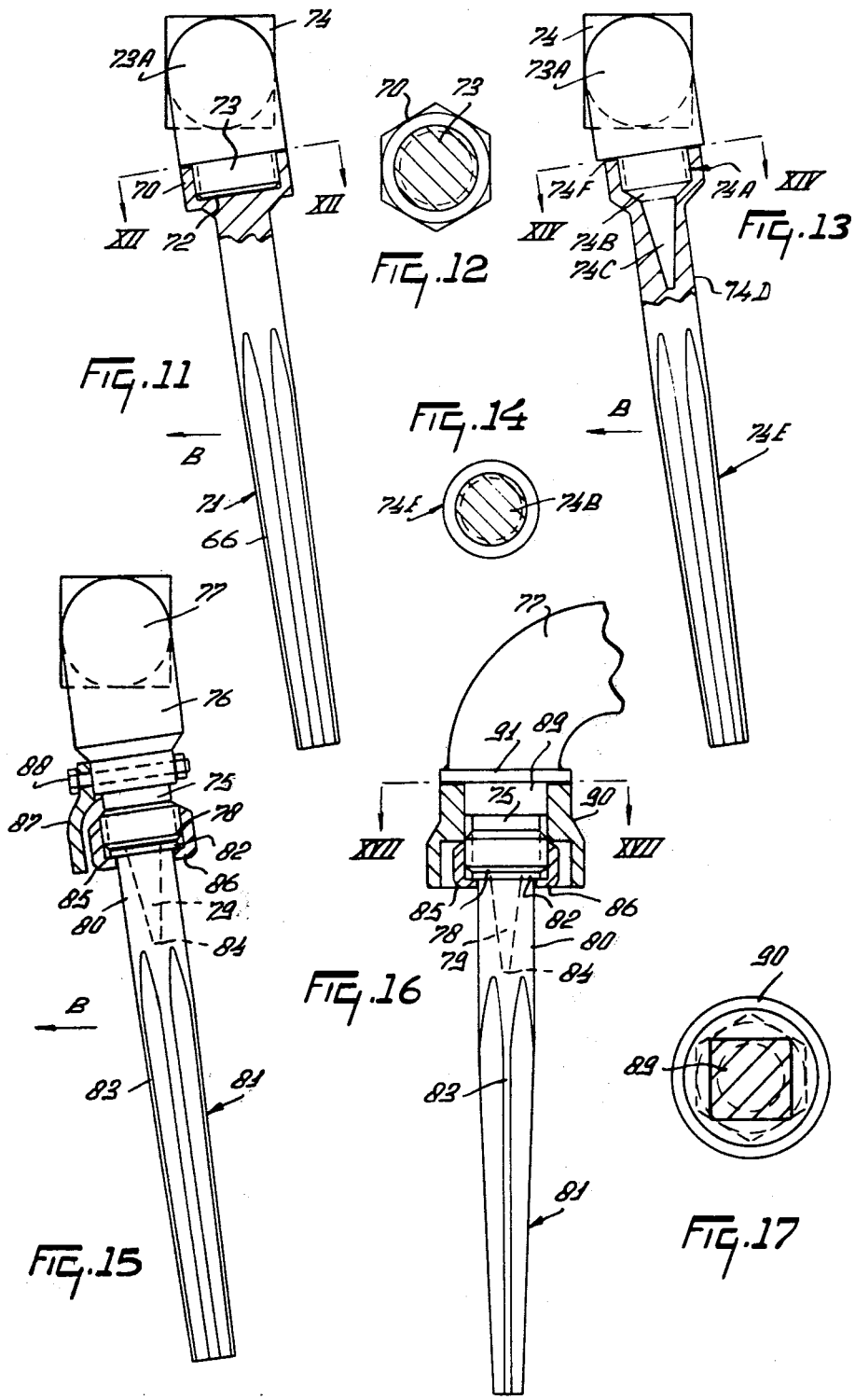

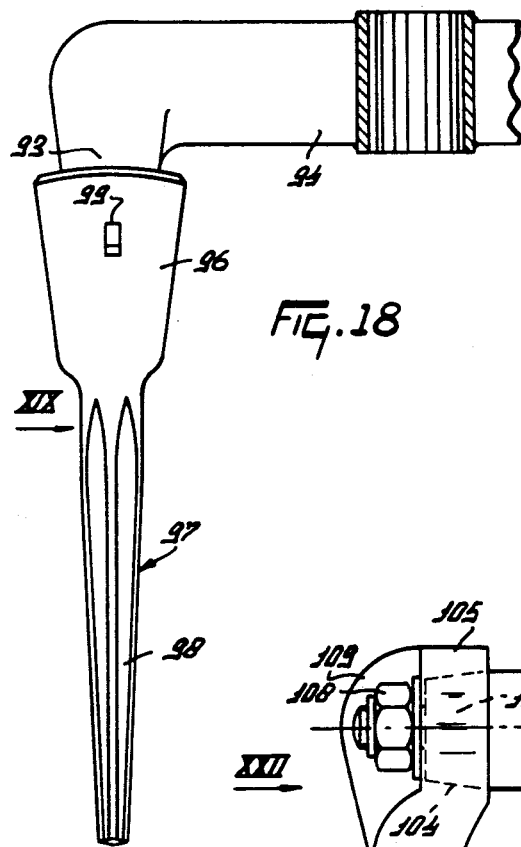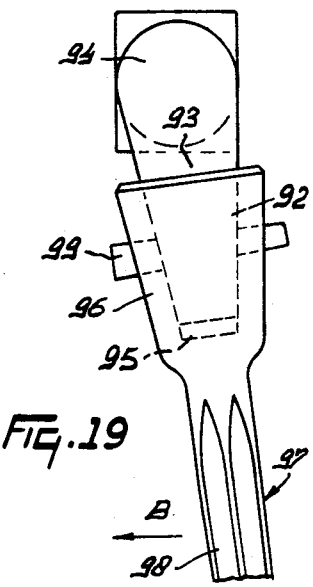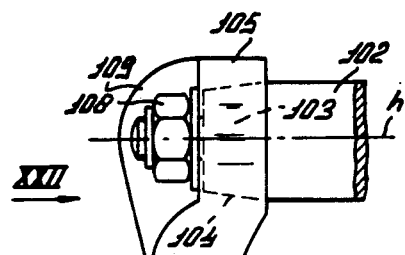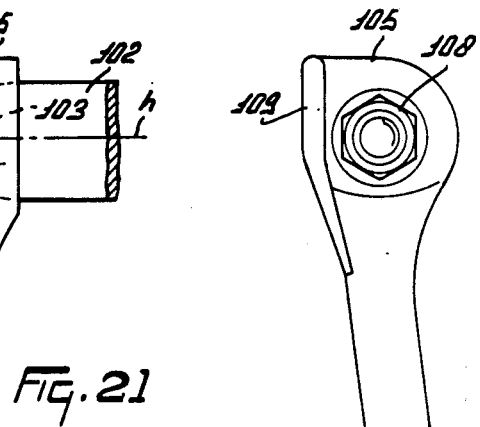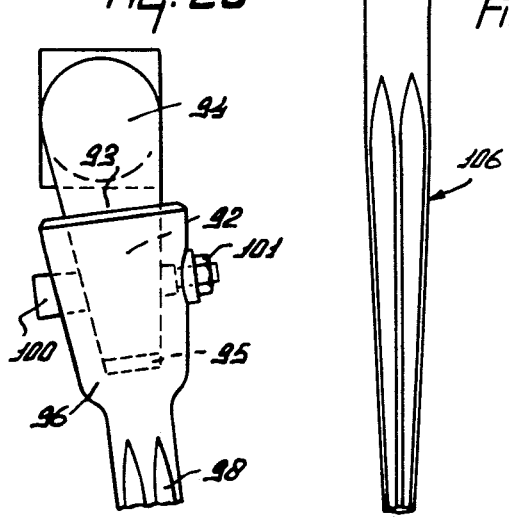

SOIL CULTIVATING IMPLEMENTS OR ROTARY HARROWS

According to the invention there is provided a soil cultivating implement or rotary harrow of the kind set forth, wherein at least one end of said tine support is provided with a tine holder which establishes said connection by being entered in a recess or cavity in the fastening portion of said tine.

Figure 1:
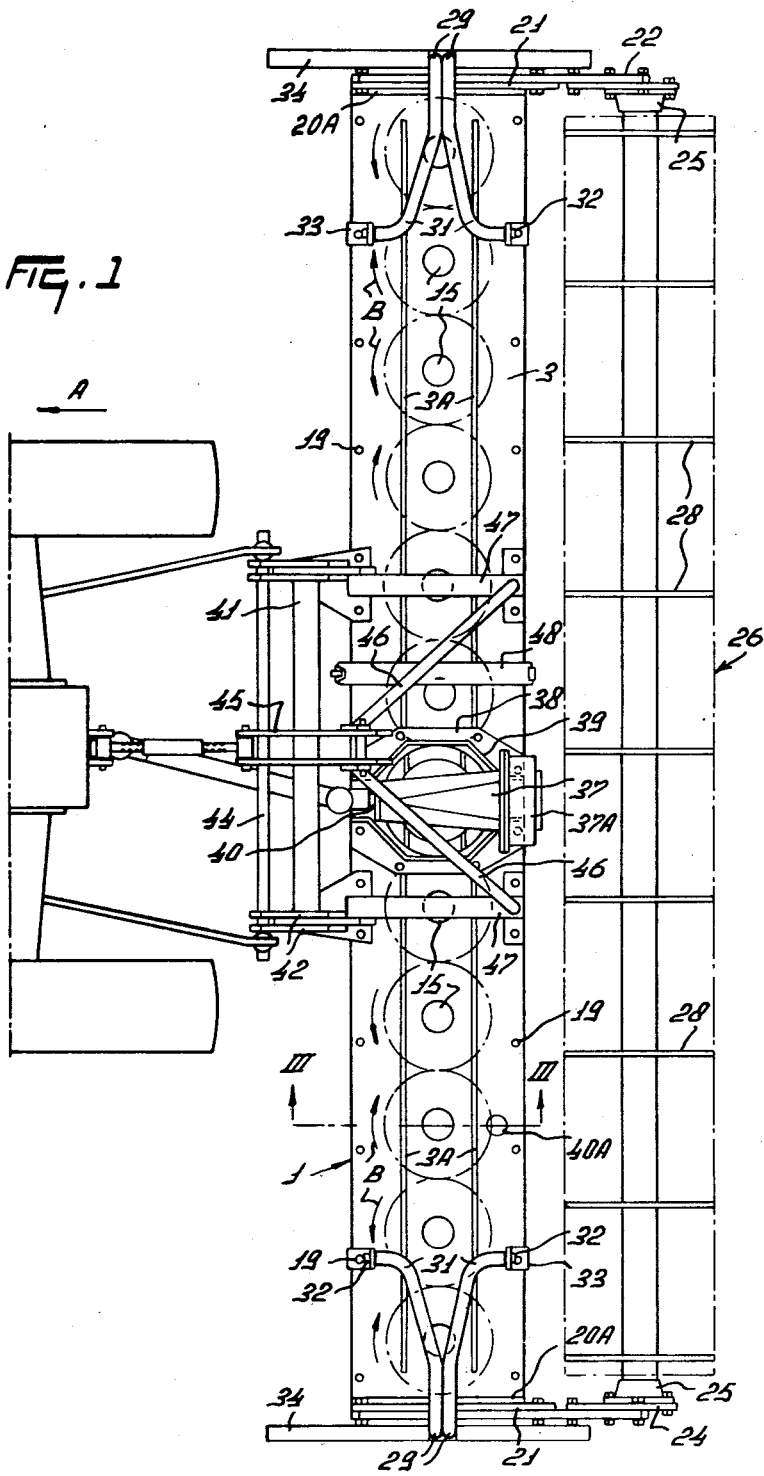
Figure 2:
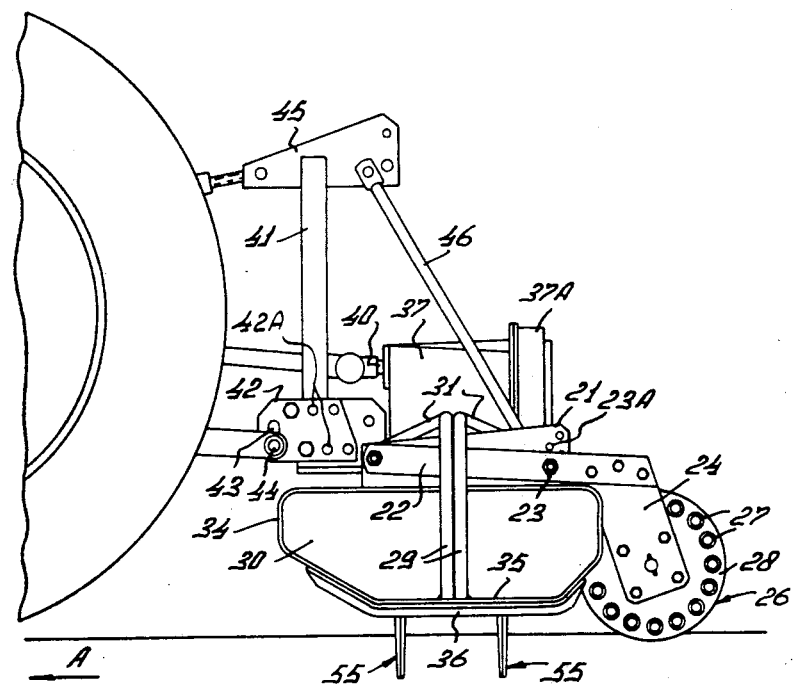
Figure 3:
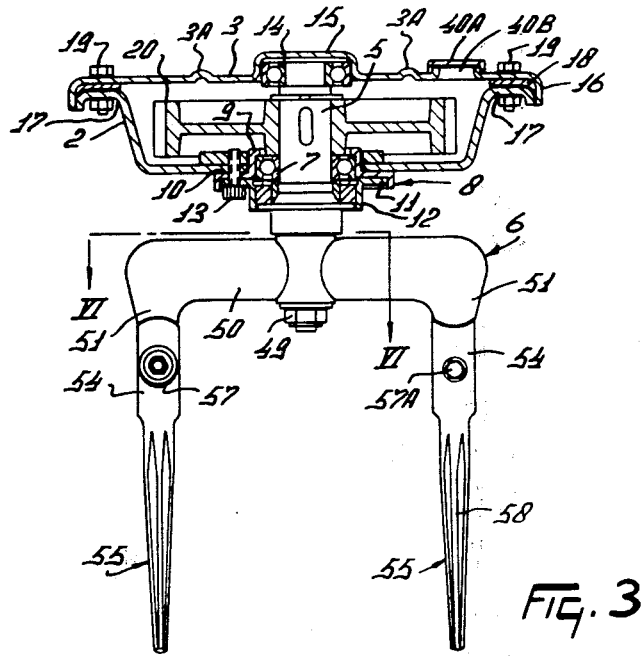

For a better understanding of the invention, and to show how the same may be carried into effect, reference will now be made, by way of example, to the accompanying drawings, in which:

FIG. 1 is a plan view of a soil cultivating implement or rotary barrow in accordance with the invention connected to the rear of an agricultural tractor, FIG. 2 is a side elevation corresponding to FIG. 1, FIG. 3 is a section to an enlarged scale taken on the line III—III of FIG. 1, FIG. 4 is a sectional elevation, to an enlarged scale, illustrating a tine construction and mounting in accordance with features of the invention, FIG. 5 is a section taken on the line V—V of FIG. 4, FIG. 6 is a section, to an enlarged scale, taken on the line VI—VI in FIG. 3, FIG. 7 is a section taken on the line VII—VII of FIG. 4, FIG. 8 is a section taken on the line VIII—VIII of FIG. 4, FIG. 9 is similar to FIG. 4 but illustrates an alternative construction and arrangement, FIG. 10 is a section taken on the line X—X of FIG. 9, FIG. 11 corresponds to FIG. 4 but shows a further alternative construction and arrangement, FIG. 12 is a section taken on the line XII—XII of FIG. 11, FIG. 13 corresponds to FIG. 4 but shows a further construction and arrangement, FIG. 14 is a section taken on the line XIV—XIV of FIG. 13, FIG. 15 is similar to FIG. 4 but shows a further construction and arrangement, FIG. 16 is similar to FIG. 4 but shows a further construction and arrangement, FIG. 17 is a section taken on the line XVII—XVII of FIG. 16, FIG. 18 is generally similar to FIG. 4 but shows a further alternative construction and arrangement, FIG. 19 is similar to FIG. 4 but shows a further alternative construction and arrangement, FIG. 20 corresponds to FIG. 19 but illustrates the employment of alternative fastening means, FIG. 21 is generally similar to FIG. 4 but shows a further alternative construction and arrangement, and FIG. 22 is an elevation as seen in the direction indicated by an arrow XXII in FIG. 21.

Referring to FIGS. 1 to 8 of the drawings, the soil cultivating implement or rotary harrow that is illustrated has a frame portion 1 that extends substantially horizontally transverse, and normally substantially perpendicular, to the intended direction of operative travel of the harrow which is indicated by an arrow A in FIGS. 1 and 2 of the drawings. The frame portion 1 is afforded principally by a beam 2 (FIG. 3) of shallow U-shaped or channel-shaped cross-section whose limbs diverge upwardly away from its base.

The upper edges of said limbs are bent over to form substantially horizontal rims 17 and at least one cover plate 3 is secured to those rims by a number of small vertically disposed bolts 19. A plurality of soil working members or rotors 6 are rotatably mounted beneath the frame portion 1 in a single row so as to be rotatable about corresponding substantially vertical, but at least upwardly extending, regularly spaced apart axes. In the particular example which is being described, there are twelve of the soil working members or rotors 6 but it is emphasised that alternative numbers thereof may equally well be provided. The axes of rotation of the soil working members or rotors 6 are afforded by corresponding substantially vertical or at least upright rotary shafts 5, said shafts 5 being mounted in lower ball bearings 7 carried in housings 8 that are received in openings or recesses in the bottom of the beam 2. Each housing 8 comprises an upper substantially horizontal portion 9 formed from sheet material that fits in the corresponding opening or recess in the beam 2, a lower substantially horizontal rim-like portion 10 and a substantially vertically bent-over circumferential lip that projects downwardly from the outermost edge of the portion 10. The lip which has just been mentioned closely surrounds a substantially horizontal rim 11 at the upper edge of a housing portion 12 that is also formed from sheet material. The housing portions 9 and 12 are secured in place, and to one another, by small substantially vertically disposed bolts 13 and, since said portions 9 and 12 are formed from sheet material, the housings 8 are of inexpensive construction and can be removed and replaced quickly and easily when access to one or more bearings 7 is required for maintenance or replacement purposes.

The upper ends of the shafts 5 are received in corresponding ball bearings 14, each bearing 14 being arranged in an individual housing 15 whose walls are integral with the cover plate 3 or corresponding cover plate 3. It can be seen from FIG. 3 of the drawings that the cover plate 3 is formed with rims 16 that are shaped to fit the previously mentioned rims 17 of the limbs of the beam 2, a gasket or packing 18 being interposed between the rims 16 and 17 and being maintained in position between those rims by the bolts 19. The or each cover plate 3 is formed with a pair of stiffening ribs 3A, said ribs 3A extending lengthwise of the or each plate 3 (i.e. perpendicular or transverse to the direction A) in parallel spaced apart relationship. The employment of the rims 16 and 17 and the stiffening ribs 3A gives the frame portion 1 sufficient rigidity even when sheet material having a thickness of less than 3 mm is employed. Fewer of the bolts 19 are required and a saving in weight is produced without any reduction in strength.

Each of the shafts 5 is provided, inside the hollow beam 2, with a corresponding straight- or spur-toothed pinion 20, said pinions 20 being disposed in such a way that the teeth of each pinion are in mesh with those of its neighbour, or both of its neighbours, in the single row thereof. The perpendicular distance between the longitudinal axes (axes of rotation) of neighbouring shafts 5 should not be greater than 30 cm and it is preferred that it should have a magnitude of substantially 25 cms. The opposite lateral sides or ends of the hollow beam 2 are closed by substantially vertical plates 20A to which plates further substantially sector-shaped plates 21 are fastened. Arms 22 are mounted alongside the plates 21 so as to project rearwardly beyond the plates 21 with respect to the direction A and so as to be turnable upwardly and downwardly with respect to the plates 21, and thus with respect to the frame portion 1, about substantially horizontally aligned pivots located at the tops and fronts of the plates 21 with respect to the direction A. Rearmost portions of the plates 21 with respect to the direction A have a substantial vertical extent and are formed with a plurality of holes 23A any chosen one of which can be brought into register with a single hole in the corresponding arm 22 by turning that arm to an appropriate angular setting about the axis of its pivotal mounting at the front of the corresponding plate 21. Substantially horizontal bolts 23 are provided for entry through the single holes in the arms 22 and the chosen holes 23A in the plates 21 to retain said arms 22 in corresponding angular settings about the substantially coincident pivotal axes of the mountings that have just been mention. The rearmost ends of the arms 22 with respect to the direction A carry supports 24 that project downwardly from those ends and rearwardly with respect to the direction A. A soil compressing member in the form of a ground roller 26 is rotatably mounted between the two supports 24 with the aid of horizontal bearings 25, said rollers 26 comprising a central axial shaft carrying a plurality, such as nine, of substantially vertical plate-like supports 28 of substantially circular configuration that are spaced apart from one another at regular intervals. The periphery of the roller 26 is provided with a plurality, such as eighteen, of elongated elements 27 that are entered through holes in the supports 28 in such a way as to be turnable in those holes and readily detachable therefrom. Small transverse "safety" pins or other simple releasable fastenings may be employed for this purpose. The elements 27 may extend parallel to the axis of rotation of the roller 26 or may be wound helically therearound to a greater or lesser extent. In the embodiment which is illustrated, each element 27 is of tubular construction but, as an alternative, said elements 27 may be of solid rod-like formation.

Shield plates 30 that are normally substantially vertically disposed and that normally extend substantially parallel to the direction are arranged alongside the opposite lateral sides or ends of the row of soil working members or rotors 6 just beyond the plates 20A and 21. Each shield plate 30 is fastened to a corresponding pair of arms 29 and it will be seen from FIGS. 1 and 2 of the drawings that first portions of said arms 29 that are fastened to the plates 30 bear against one another and extend substantially vertically upwards in parallel and abutting relationship with the plates 30 concerned. The arms 29 project upwardly beyond the top edges of the plates 30 for a distance and are then bent over through substantially 90° towards the center of the frame portion 1. At a distance inwardly towards that center from the bend, the two arms 29 of each pair start to diverge and the ends thereof that are remote from the plates 30 are bent over to form end portions 31 with each pair of end portions 31 extending in aligned opposite directions that are substantially horizontally parallel to the direction A. The arms 29 are of tubular formation and the extremities of their end portions 31 are received turnably around stub shafts 32 that are secured to upright limbs of angular lugs 33 which have horizontal limbs that are fastened to the top or tops of the plate or plates 3 by correspondingly appropriately positioned bolts 19. Each shield plate 30 is thus turnable upwardly and downwardly about a substantially horizontal axis, extending substantially perpendicular to the direction A, that coincides with the aligned longitudinal axes of the corresponding pair of stub shafts 32. The hollow end portions 31 of the tubular arms 29 that turnably receive the stub shafts 32 constitute very simple and inexpensive bearings for the pivotably mounted shield plates 30.

Each shield plate 30 is formed around its circumference with a corresponding transverse, and normally perpendicular, rim 34 that projects outwardly from the corresponding plate 30 with respect to the center of the frame porton 1. It can be seen from FIG. 2 of the drawings that each rim 34 includes, a long the lowermost edge of the corresponding plate 30, a ground-engaging portion 35 whose rearmost end terminates in an upwardly, and rearwardly with respect to the direction A, inclined portion and whose leading end terminates in an upwardly, and forwardly with respect to the direction A, inclined portion, the last mentioned portion being inclined to the horizontal at a smaller angle than the portion at the rear end of the ground-engaging portion 35. The bottom of each ground-engaging portion 35 is provided with a corresponding rib or runner 36, said rib or runner 36 being substantially coplanar with the corresponding plate 30 and having leading and rearmost end regions that are bent over to match the portions of the rims 34 that have just been described and that lie at opposite ends of the ground-engaging portion 35 of that rim 34. The provision of the ribs or runners 36 enables the shield plates 30 to slide over the ground surface during the operation of the harrow in relatively stable positions and brings wear upon the lowermost edges of said plates 30 and the ground-engaging portions 35 of their rims 34 to a minimum. The ribs or runners 36 are releasably secured to the rims 34 to enable them to be replaced when this eventually becomes necessary after inevitable wear has occurred. The height of the ribs or runners 36 is such that they do not interfere with the upward and downward pivotal movements of the plates 30 in any way and it will be noted from FIG. 2 of the drawings that the extreme leading and rearmost ends of each rib or runner 36 with respect to the direction A are bevelled.

The soil working members or rotors 6 are rotated, during the use of the implement or harrow, by a drive transmission which includes parts contained within a gear box 37 that is located, when the implement or harrow is viewed from the rear in the direction A, slightly to the left of the centre of the frame portion 1 above the sixth soil working member or rotor 6 counting from the left-hand end of the single row thereof under the conditions just mentioned. A substantially horizontal plate 38 is arranged on top of the cover plate or plates 3 and is provided with an upright rim 39 which substantially surrounds the gear box 37. Owing to the provision of the rim 39, the plate 38 may be formed from thinner material than would otherwise be necessary so that there is a saving in weight and the shaping of the plate 38 is facilitated. The shaft 5 that corresponds to the soil working member or rotor 6 above which the gear box 37 is mounted is extended upwardly into that gear box, the extension carrying a bevel pinion whose teeth are in mesh with those of a further bevel pinion carried by a shaft (not visible) that extends substantially horizontally parallel to the direction A. The rearmost end of the shaft which has just been mentioned extends into a change-speed gear 37A by which it can be connected to a further overlying and parallel substantially horizontal shaft 40 by alternative toothed pinions that can give a number, such as four, of different transmission ratios depending upon their relative arrangement. It is not necessary to describe the construction and arrangement of the change-speed gear 37A in further detail for the purposes of the present invention. As can be seen in FIGS. 1 and 2 of the drawings, the leading end of the upper substantially horizontal shaft 40 that extends substantially parallel to the direction A projects from the front of the gear box 37 where it is splined or otherwise keyed to enable it to be placed in driven connection with the power take-off shaft of an agricultural tractor or other operating vehicle by means of an intermediate telescopic transmission shaft of a construction that is known per se having universal joints at its opposite ends. The change-speed gear 37A is adjusted to give a speed of revolution of the soil working members or rotors 6 in response to a more or less constant speed of rotation of the power take-off shaft of the operating tractor or other vehicle that is appropriate to the particular operation that is to be carried out, the nature of the soil that is to be worked and factors such as the moisture content of the soil. The cover plate 3, or one of the cover plates 3, is formed with a lubricant filling opening 40B, said opening being provided with a removable cap or plug 40A formed from a synthetic plastics material. In the operation of the soil cultivating implement or rotary harrow, the hollow interior of the beam 2 is partially filled with oil so that the pinions 20 are substantially constantly immersed in an oil bath.

The front of the frame portion 1 with respect to the direction A has a coupling member or trestle 41 of generally triangular configuration secured to it, said coupling member or trestle being employed in connecting the frame portion 1 to the three-point lifting device or hitch at the rear of an operating agricultural tractor or other vehicle. The coupling member or trestle 41 is provided, at substantially the same level as the frame portion 1, with two pairs of substantially vertical plates 42 which are formed at their fronts with respect to the direction A with substantially vertical slots 43. A substantially horizontal rod 44 that extends perpendicular, or at least transverse, to the direction A is entered through all four of the slots 43 and the opposite ends of said rod that project beyond the furthest remote plates 42 constitute coupling points to which the free ends of the lower lifting links of the three-point lifting device or hitch of an operating agricultural tractor or other vehicle are pivotally connected in the manner shown in outline in FIGS. 1 and 2 of the drawings. The apex of the coupling member or trestle 41 is provided with a pair of substantially vertical plates 45 that both extend substantially parallel to the direction A in closely spaced apart relationship. As shown in the drawings, the free end of the upper adjustable lifting link of the three-point lifting device or hitch of the operating agricultural tractor or other vehicle is pivotally mounted between the two plates 45. Rear regions of the two plates 45 with respect to the direction A are coupled to the upper ends of two tie rods 46 tha diverge downwardly, and rearwardly with respect to the direction A, away from said plates 45, the lowermost and rearmost ends of said tie rods 46 being fastened to strengthening beams 47 that extend substantially horizontally parallel to the direction A on top of the cover plate or plates 3. The leading ends of the beams 47 are connected to substantially vertical plates sandwiched between the two pairs of similarly disposed plates 42. A box 48 that may conveniently store tools, spare parts and the like is located at one side of the gear box 37 on top of the plates or plates 3 and between the strengthening beams 47, said box 48 preferably being provided with a pivotable lid that can be retained closed in the simple manner which can be seen in outline in FIG. 1 of the drawings. Each of the plates 42 is formed with a plurality, such as three, of pairs of upper and lower holes 42A so that said plates can be releasably fastened by bolts to the vertical plates that are sandwiched between them in any chosen positions corresponding to the use of single pairs of the holes 42A, said positions being more or less advanced with respect to the direction A as compared with the frame portion 1.

The lowermost end of each shaft 5 that projects from beneath the frame portion 1 is splined or otherwise keyed and has a lowermost screwthreaded extremity. Corresponding wrought-iron tine supports 50 (FIGS. 3 and 6) formed with central matchingly splined or otherwise keyed holes are fastened to said ends of the shafts 5 by entering those ends through the holes which have just been mentioned and maintaining the connections with the aid of nuts 49 that co-operate with the screwthreads referred to above. The opposite ends of each tine support 50 are bent over downwardly to form portions 51 that extend substantially parallel to the axis of the corresponding shaft 5 but that are actually inclined to the vertical by a few degrees (when the axis of the corresponding shaft 5 is strictly vertically disposed) so as to trail rearwardly to a small extent with respect to the intended direction of rotation B (FIGS. 1 and 4) of the soil working member or rotor 6 concerned. Each bent-over portion 51 comprises a milled holder 52 that is entered into a substantially matchingly shaped recess or cavity 53 in an upper fastening portion 54 of a tine 55. In this embodiment, the holder 52 is of substantially right-circular cylindrical configuration throughout its length, that length exceeding its diameter. The lowermost end of the holder 52 carries a projecting boss-like portion 56 that is of smaller diameter than the holder 52 and that has an axial length which is equal to substantially one-fourth of the total length of the combined holder 52 and boss-like portion 56. As can be seen in FIG. 4 of the drawings, the boss-like portion 56 fits in a matchingly shaped end part of the corresponding recess or cavity 53. Approximately midway along its upright length, each tine fastening portion 54 is formed through its walls with diametrically opposed holes that are aligned in a direction perpendicular to the length of the portion 54. One of each pair of the holes that have just been mentioned is surrounded by a projecting rim 57 while the other hole of each pair is recessed, the recess having a hexagonal or other shape that fits the head of a transverse fastening bolt 57A that is entered through both said holes and through an aligned transverse bore in the holder 52. A nut that cooperates with the screwthreaded shank of the bolt 57A is received inside the rim 57 where it can be tightened or loosened easily by a box spanner or the like due to the head of the bolt 57A being prevented from turning movement by its disposition in the matchingly shaped hole at the opposite side of the fastening portion 54. It will be noted from FIGS. 4 and 5 of the drawings that the leading side of tine fastening portion 54 with respect to the intended direction of rotation B of the soil working member or rotor 6 concerned is of greater thickness than the trailing side thereof in order to compensate for the greater rate of wear which will inevitably occur on that leading side as a consequence of the operation of the soil cultivating implement or harrow.

The fastening portion 54 of each tine 55 merges, by way of an inverted frusto-conical portion, into an active or soil working portion 58 of the tine. The recess or cavity 53 has a length which is equal to substantially 1/3 of that of that of the active or soil working portion 58. Moving downwardly along a soil working portion 58 from its uppermost end, it commences with a substantially right-circular cylindrical cross-section, there being a very gentle taper downwards towards the free end or tip of the tine. The taper commences at a short distance beneath the upper end of the portion 58 and the tapering portion is of rectangular cross-section. It can be seen from a comparison of FIGS. 7 and 8 of the drawings that, as the portion 58 tapers gently towards its lowermost free end or tip, there is some flattening thereof to an extent such that, near the free end or tip (FIG. 8) one diagonal (in cross-section) between two opposite corners has a greater magnitude than a second relatively perpendicular diagonal between the other two opposite corners. The arrangement of the whole tine 55 is such that the greater diagonal (in cross-section) that has just been mentioned extends substantially tangentially with respect to a circle centered upon the axis of rotation defined by the corresponding shaft 5. Four concave or at least hollow grooves 59 extend throughout substantially the whole of the length of the active or soil working portion 58 in each of the what would otherwise be flat sides thereof. The uppermost ends of the four grooves 59 taper into the upper cylindrical region of the active or soil working portion 58 and terminate at points in that region.

FIG. 9 and 10 of the drawings illustrate an alternative embodiment in which a tine support 62 has downwardly bent-over end portions 61A that are provided with holders 61 that are of shorter axial length than the previously described holders 52. Tines 64 are provided which, as a consequence, have shorter fastening portions 63 formed with shorter recesses or cavities 65. In this embodiment, each fastening portion 63 merges by way of a frusto-conical tapering portion into an active or soil working portion 66 which is similar to the previously described portions 58 except that it is of somewhat greater length. The holder 61 is formed throughout its length with a screwthread that is arranged to co-operate with a matching screwthread formd internally of the recess or cavity 65, the length of the holder 61 being at least substantially equal to its own diameter. The inner end of the recess or cavity 65 is formed with a transverse hole or bore 67 that is arranged to receive a pin 68 is equilateral triangular cross-section. The pin 68 is arranged to co-operate with an angular groove formed across the lowermost end of the holder 61. Once the tine 66 has been screwed onto one of the holders 61 until the upper end of its fastening portion 63 meets a shoulder 69 between that holder 61 and the corresponding bent-over end portion 61A, the fastening portion 63 is retained against becoming unscrewed from the holder 61 by driving in the pin 68. The fastening portion 63 may have a right-circular cylindrical external configuration or may be formed with two or more opposed plates. Appropriate toothed tools or fixed or adjustable spanners/wrenches may be employed to remove or install the tines 66 by engaging the exteriors of their fastening portions 63.

FIGS. 11 and 12 of the drawings illustrate an alternative embodiment in which holders 73 are provided that have an even shorter axial length than the previously described holders 61. The axial length of each holder 73 is smaller than is diameter and it will be seen from the drawings that the shapes and lengths of co-operating tine fastening portions 70 and their recesses or cavities 72 match the dimensions of the holders 73. The holders 73 and the recesses or cavities 72 are formed with co-operating screwthreads and said holders 73 are formed integrally at the lower ends of downwardly bent-over end portions 73A of tine supports 74. The fastening portions 70 form parts of tines 71 that have active or soil working portions 66 which are substantially identical to the portions 66 that have already been described.

FIGS. 13 and 14 of the drawings illustrate an embodiment which is similar in many respects to that of FIGS. 11 and 12 but in which a screwthread holder 74A of cylindrical formation is integrally connected by a frusto-conical shoulder 74B to a conically tapering portion 74C. A co-operating tine 74E has a fastening portion 74D that is formed with a recess or cavity that matches the combined shape of the parts 74A, 74B and 74C. An upper internal region of the recess or cavity that has just been mentioned in formed with a screwthread for co-operation with the outer screwthread surface of the holder 74A. When the tine 74E has been screwed tightly onto the holder 74A, the upper free end of its fastening portion 74B bears firmly against a shoulder 74F formed between the holder 74A and the corresponding bent-over end portion 73A of the time support 74. The fastening portions 70 and 74A of the embodiments of FIGS. 11 to 14 of the drawings may be formed with an outer surface of circular cross-section (FIG. 14) or of hexagonal or other cross-section (FIG. 12) for co-operation with a spanner, wrench or other tool.

FIG. 15 of the drawings illustrates an alternative construction in which tine supports 77 have downwardly bent-over end portions 76 each of which merges into a cylindrical holder portion 75 having a screwthread and a downwardly tapering shoulder 78 and, beneath that shoulder, into a downwardly tapering conical portion 79. The length of the conical portion 79 is substantially equal to the length of the cylindrical holder portion 75. In this embodiment, a co-operating tine 81 has a fastening portion 80 which is provided, at its upper end, with a collar 82 that exhibits an upwardly directed abutment surface arranged to co-operate with a downwardly directed abutment surface of the shoulder 78 when the tine 81 has been secured in its operative position. The fastening portion 80 of the tine 81 is formed with a downwardly tapering recess or cavity 84 which is shaped to receive the conical portion 79 of the holder. In this embodiment, the collar 82 at the top of the fastening portion 80 of the tine 81 is quite small so that less material is required for its formation than is necessary for the parts that serve similar functions in the preceding embodiments. The tine 81 has an active or soil working portion 83 tht is similar to the active or soil working portions of previously described tines and said tine is secured to the holder 75 with the aid of a cup nut 85 whose screwthread co-operates with the screwthread of the cylindrical holder portion 75 and which has an inwardly directed flange 86 that engages behind the collar 82 at the top of the fastening portion 80. When the cup nut 85 is tightened, its inwardly directed flange 86 draws the previously mentioned co-operating surfaces of the collar 82 and the shoulder 78 firmly into abutting engagement with one another, the conically tapering portion 89 of the holder being entered in the recess of cavity 84, The cylindrical portion 75 of the holder is provided, near its uppermost end, with a downwardly directed shield 87 that is maintained in position by a bolt 88 entered through a transverse bore in said holder portion 75. The shield 87 extends downwardly from the bolt 88 in screening relationship with the cup nut 85 and the parts which that nut surrounds when in its illustrated operative position. The shield 87 is located at the front of the tine 81 with respect to the intended direction of rotation B of the corresponding soil working member or rotor 6 and said shield serves to prevent the fastening means of the tine from being damaged by stones and other obstacles which may be met with during a cultivating/harrowing operation.

FIGS. 16 and 17 of the drawings illustrate a further alternative construction which is, however, similar in many respects to the construction that has just been described with reference to FIG. 15. In this embodiment, however, a polygonal portion 89, that is of square cross-section in the illustrated embodiment, is provided above the cylindrical holder portion 75, the polygonal portion 89 being surrounded by a screening portion in the form of a sleeve-like shield 90. The tine holder is provided with a collar 91 immediately above the polygonal portion 89 and, when the shield 90 is in its illustrated operative positions in which the upper end thereof abuts against said collar 91, the lowermost end of the shield is located at a horizontal level at least as low as that of the bottom of the cup nut 85. The upper end of the interior of the sleeve-like shield 90 is of the same cross-sectional configuration as the polygonal portion 89 of the holder and, when the tine 81 is being installed, the shield 90 is arranged around said portion 89 before the fastening means that incorporates the cup nut 85 is brought to its operative position. Tightening of the cup nut 85 causes the upper end of the shield 90 to be urged into firmly abutting relationship with the lower surface of the collar 91 as will be evident from FIG. 16 of the drawings. When the front of the shield 90 with respect to the direction B (FIG. 15) has become badly worn or damaged by stones or the like, the cup nut 85 can be loosened, the shield 90 turned through 90° around the axis of the tine holder and the nut 85 finally be retightened. A fresh substantially unworn and undamaged portion of the shield 90 will then be foremost with respect to the direction B while the worn and/or damaged portion thereof will be located at one side of the tine holder as viewed in the direction B where it will be subject to little, if any, further wear. It will be realised that the re-positioning of the shield 90 that has been described can be undertaken three times with the described and illustrated construction so that the useful life of the shield can be correspondingly extended.

FIGS. 18 and 19 of the drawings illustrate a construction in which tine supports 94 have downwardly bent-over end portions 93 that are integral with downwardly tapering tine holders 92 that are of polygonal cross-section. Each tine holder 92 co-operates with a fastening portion 96 of a corresponding tine 97, said fastening portion 96 being formed with an internal downwardly tapering recess or cavity 95 whose size and shape match those of the holder 92. It will be seen from FIGS. 18 and 19 of the drawings that the fastening portion 96 itself is of downwardly tapering configuration, the lower end of said fastening portion 96 being integral with a downwardly tapering a grooved active or soil working portion 98. The fastening portion 96 is maintained in engagement with the holder 92 by forming said holder with a transverse hole and by forming substantially diagonally opposed holes in the wall of the recess or cavity 95. A gently tapering key or cotter 99 is driven through the aligned holes to maintain the required connection ensuring that the broadest end of the key or cotter 99 is located foremost with respect to the direction B so tht any blow against a stone or other obstacle will tend to tighten the connection rather than loosen the same.

FIG. 20 of the drawings illustrates a further alternative embodiment which is, however, similar in most respects to the embodiment of FIGS. 18 and 19 of the drawings. In the embodiment of FIG. 20, a tapering key or cotter pin 10 takes the place of the key or cotter 99 and is provided at its narrowest end with a screwthreaded stub shaft which receives a washer and a retaining nut 101. It should be noted that screening portions similar to the shields 87 and 90 that have been described may be provided to co-operate protectively with the fastening means that are employed in any of the embodiments that have so far been described with reference to FIGS. 3 to 14 or 18 to 20 of the drawings.

FIGS. 21 and 22 of the drawings illustrate a further alternative embodiment in which a tine support 102 is provided that does not have downwardly bent-over end portions. Each end of the tine support 102 is, instead, formed as a tapering tine holder 103 tht is preferably of a polygonal cross-section. The free end of the holder 103 is integral with a screw-threaded stub shaft that is adapted to receive a fastening nut 108 and a co-operating washer. It will be noted that the tine support 102, the illustrated tine holder 103 and its screwthreaded stub shaft all have a common longitudinal axis $h$. Tines 106 are provided and each tine has a fastening portion 105 at its upper end, said fastening portion 105 being formed with a transverse recess or cavity 104 which is of the same cross-sectional configuration as the holder 103 and through which said holder 103 is entered. The tine 106 that is illustrated has an active or soil working portion 107 that is similar to the previously described active or soil working portions and it will be seen from the drawings that the longitudinal axis of said portion 107 is inclined to the longitudinal axis of the recess or cavity 104 in the fastening portion 105 (which axis coincides with the axis $h$) at an angle which differs by only a few degrees from a right-angle. when the nut 108 is tightened, the fastening portion 105 is clamped into abutting engagement with a collar or shoulder of the holder 103. It will be seen that the fastening portion 105 of the tine 106 is provided with a screening portion in the form of a shield 109 that is located in front of the retaining nut 108 and the co-operating screw-threaded stub shaft with respect to the intended direction of rotation B of the rotor or soil working member 6 concerned. The likelihood of damage to the fastening means for each tine 106 is thus very greatly reduced.

In the use of a soil cultivating implement or rotary harrow of the kind that has been described when provided with any of the tines and tine mountings as described in FIGS. 3 to 22 inclusive of the drawings, the coupling member or trestle 41 is connected to the three-point lifting device or hitch of an operating agricultural tractor or other vehicle and the projecting leading end of the shaft 40 is placed in driven connection with the power takeoff shaft of the same tractor or other vehicle by way of an intermediate telescopic transmission shaft of a construction that is known per se having universal joints at its opposite ends. Upon operative travel over a field, the drive that is imparted to the shaft 40 causes the soil working members or rotors 6 to revolve in the directions B that are shown in FIG. 1 of the drawings. The perpendicular distance between the lowermost free ends of tips of the two tines of each member or rotor 6 is slightly greater than the perpendicular distance between the axes of rotation of immediately neighbouring shafts 5 so that the individual strips of soil that are worked by the various members or rotors 6 overlap to produce, in effect, a single broad strip of worked soil. The working depth of the tines in controlled by engaging the bolts 23 in appropriate holes 23A in the plates 21. This governs the level of the axis of rotation of the roller 26 with respect to the remainder of the implement or harrow and consequently controls the maximum depth to which the tines can penetrate into the soil. The various methods of mounting the tines that have been described permit those tines to be fastened in their operative positions, and to be removed from those positions, both quickly and easily, the tines nevertheless remaining reliably connected to their supports through the intermediary of the holders during operation. With some of the embodiments, such as those that have been described with reference to FIGS. 9 to 17 of the drawings, some material is saved as compared with known constructions so that the tines may be made less expensive without any loss of efficiency.

Although various features of the soil cultivating implement or harrow and tines and tine mountings that have been described and/or illustrated in the accompanying drawings will be set forth in the following claims as inventive features, it is emphasised that the invention is not necessarily limited to those features and that it includes within its scope every part of the soil cultivating implement or rotary harrow and each tine and tine mounting that has been described and/or illustrated both individually and in various combinations.

I claim:

1. A cultivating implement comprising a plurality of soil-working members positioned in a row that extends transverse to the direction of travel, each of said soil-working members having a substantially horizontal support mounted for rotation on an upwardly extending shaft and driving means connected to rotate said soil-working members each support having at least one holder comprising a downwardly extending portion that is spaced from said shaft and fitted with soil-working means that is rotatable about said shaft, said soil-working means including a lower soil-working portion and an upper fastening portion having a cavity, the lower part of said holder being received in said cavity and fastening means connected to said holder for releasably retaining the holder in said cavity and preventing relative turning, the lower part of said holder which is received in said cavity having a cross-section which is smaller than the cross-section of the remainder of said holder and extending substantially parallel to the axis of rotation of the soil-working member, said holder including an abutment surface above its lower end that engages a cooperating abutment surface of the fastening portion of soil-working means, said fastening means being received in cooperating bores in said upper fastening portion and the lower part of said holder, said upper fastening portion comprising an inverted frusto-conical portion that merges into the lower soil-working portion.

2. An implement as claimed in claim 1, wherein said lower part of the holder is of right circular cylindrical configuration.

3. An inplement as claimed in claim 1, wherein said lower part of the holder is of polygonal cross-section for at least part of its length.

4. An implement as claimed in claim 1, wherein said soil-working means is a tine having a fastening portion with a cavity that extends in the axial direction of said tine for a length which is equal to not less than about one third the length of the soil-working portion of said tine, said soil-working and fastening portions being substantially coaxial.

5. An implement as claimed in claim 4, wherein said soil-working portion of the tine is straight, tapers towards its tip and has a polygonal cross-section adjacent said tip, and the distances between opposite corners of said cross-section, as seen in cross-section, vary.

6. An implement as claimed in claim 1, wherein said support is perpendicular to the axis of rotation of said soil-working member and said holder is formed by a bent-over portion of said support.

7. An implement as claimed in claim 1, wherein said fastening portion is substantially in coaxial alignment with said lower part of the holder.

8. An implement as claimed in claim 1, wherein said lower part of the holder is inclined rearwardly with respect to the normal direction of rotation of a soil-working member.

9. A cultivating implement comprising a plurality of soil-working members positioned in a row that extends transverse to the direction of travel, each of said soil-working members having a substantially horizontal support mounted for rotation on an upwardly extending shaft and driving means connected to rotate said soil-working members, each support having at least one downwardly extending holder that is spaced from said shaft and fitted with soil-working means, the latter means including a lower soil-working portion and an upper fastening portion with a cavity, the lower part of said holder being received in said cavity and fastening means connected to said holder for releasably retaining same in said cavity and preventing relative turning, said lower part having a cross-section which is smaller than the cross-section of the remainder of said holder, said lower part extending substantially parallel to said shaft which forms the axis of rotation of the soil-working member and being inclined rearwardly with respect to the normal direction of rotation of that member, said holder including an abutment surface above its lower end that engages a cooperating abutment surface of the fastening portion of said soil-working means, said fastening means being received in cooperating bores in said upper fastening portion and the lower part of said holder, said upper fastening portion comprising an inverted frusto-conical portion that merges into the lower soil-working portion.

10. A cultivating implement comprising a plurality of soil-working members positioned in a row that extends transverse to the direction of travel, each of said soil-working members having a substantially horizontal support mounted for rotation on an upwardly extending shaft and driving means connected to rotate said soil-working members, each support having at least one downwardly extending holder that is spaced from said shaft and fitted with a tine, said tine including a lower soil-working portion and an upper fastening portion with a cavity, the lower part of said holder being received in said cavity and fastening means connected to said holder for releasably retaining same in said cavity and preventing relative turning, said lower part of the holder having a cross-section which is smaller than the cross-section of the remainder of the holder and said lower part extending substantially parallel to said shaft which forms the axis of rotation of the soil-working member and being inclined rearwardly with respect to the normal direction of rotation of that member, said m holder including an abutment surface above its lower end that engages a cooperating abutment surface of the fastening portion of said soil-working means, said fastening means being received in cooperating bores in said upper fastening portion and the lower part of said holder, said upper fastening portion comprising an inverted frusto-conical portion that merges into the lower soil-working portion.

* * * * *